(12) United States Patent
Pope et al.

(10) Patent No.: US 9,537,230 B2
(45) Date of Patent: Jan. 3, 2017

(54) CABLE REPAIR SPLICE

(71) Applicants: Tyco Electronics Corporation, Berwyn, PA (US); Tyco Electronics UK Ltd., Swindon (GB); The United States of America as represented by the Secretary of the Navy, Washington, DC (US)

(72) Inventors: Martin Pope, Swindon (GB); Thomas A. Briere, North Richland Hills, TX (US); Robert P. Moore, Redwood City, CA (US); Nina Przybylska, Swindon (GB); Oliviu Muja, Lexington Park, MD (US)

(73) Assignees: Tyco Electronics Corporation, Berwyn, PA (US); Tyco Electronics UK Ltd., Swindon, Wiltshire (GB); The United States of America as represented by the Secretary of the Navy, Washington, DC (US)

( * ) Notice: Subject to any disclaimer, the term of this patent is extended or adjusted under 35 U.S.C. 154(b) by 53 days.

(21) Appl. No.: 14/047,889

(22) Filed: Oct. 7, 2013

(65) Prior Publication Data

US 2015/0096803 A1 Apr. 9, 2015

(51) Int. Cl.
*H01G 15/00* (2013.01)
*H01R 4/72* (2006.01)
(Continued)

(52) U.S. Cl.
CPC ............... *H01R 4/72* (2013.01); *H01R 9/0503* (2013.01); *H02G 1/16* (2013.01); *H02G 15/1806* (2013.01); *H01R 2103/00* (2013.01); *H02G 1/14* (2013.01)

(58) Field of Classification Search
CPC ...... H02G 15/04; H02G 15/06; H02G 15/068; H02G 15/013; H02G 15/0616; H02G 15/184; H02G 15/1806; H02G 15/18; H02G 15/24; H01R 4/72; H01R 13/18
(Continued)

(56) References Cited

U.S. PATENT DOCUMENTS 3,804,972 A * 4/1974 Gommans et al. ......... 174/88 C
3,859,455 A * 1/1975 Gommans et al. ......... 174/88 C
(Continued)

FOREIGN PATENT DOCUMENTS

FR 2638574 A1 5/1990

OTHER PUBLICATIONS

International Search Report for International Patent Application No. PCT/US2014/059518, mailed Jul. 17, 2015.

*Primary Examiner* — William H Mayo, III

(57) ABSTRACT

A splice kit is provided for repairing a cable having a central conductor, an insulator surrounding the central conductor, an outer conductive sheath surrounding the insulator, and a jacket surrounding the outer conductive sheath. The splice kit includes a central conductor joint that is electrically conductive and is configured to engage the central conductor of the cable such that the central conductor joint defines a portion of an electrical path of the central conductor. The splice kit also includes a dielectric insert configured to at least partially surround the central conductive joint and the central conductor of the cable, and an outer sheath joint that is electrically conductive and is configured to at least partially surround the dielectric insert. The outer sheath joint is configured to be electrically connected to the outer conductive sheath of the cable such that the outer sheath joint defines a portion of an electrical path of the outer conductive sheath. The splice kit further includes a jacket (Continued)

joint configured to at least partially surround the outer sheath joint and the jacket of the cable.

20 Claims, 8 Drawing Sheets

(51) Int. Cl.
  *H02G 1/16* (2006.01)
  *H02G 15/18* (2006.01)
  *H01R 9/05* (2006.01)
  *H02G 1/14* (2006.01)
  *H01R 103/00* (2006.01)

(58) Field of Classification Search
  USPC ............... 174/74 R, 74 C, 84 R, 84 C, 88 C
  See application file for complete search history.

(56) References Cited

U.S. PATENT DOCUMENTS

| | | | |
|---|---|---|---|
| 4,144,404 A * | 3/1979 | De Groef et al. ........... 174/88 C |
| 4,234,758 A * | 11/1980 | Guzy ........................... 174/84 R |
| 4,304,616 A * | 12/1981 | Richardson ......... B29C 61/0616 |
| | | | 156/86 |
| 4,639,545 A * | 1/1987 | Pithouse et al. ................ 174/36 |
| 4,778,948 A | 10/1988 | Fitch et al. |
| 4,831,214 A * | 5/1989 | Wilck ................ H02G 15/1806 |
| | | | 156/49 |
| 5,217,392 A * | 6/1993 | Hosler, Sr. ..................... 439/585 |
| 5,231,249 A * | 7/1993 | Kimura et al. ......... 174/105 SC |
| 5,371,322 A | 12/1994 | Selmeski |
| 6,281,442 B1 * | 8/2001 | Guzowski .................... 174/73.1 |
| 7,038,490 B1 * | 5/2006 | Singh et al. ..................... 326/41 |
| 7,364,454 B2 * | 4/2008 | Brus .............................. 439/441 |
| 7,767,909 B2 * | 8/2010 | Krabs et al. ................ 174/84 R |
| 2009/0218135 A1 * | 9/2009 | Vallauri et al. ............. 174/88 C |

* cited by examiner

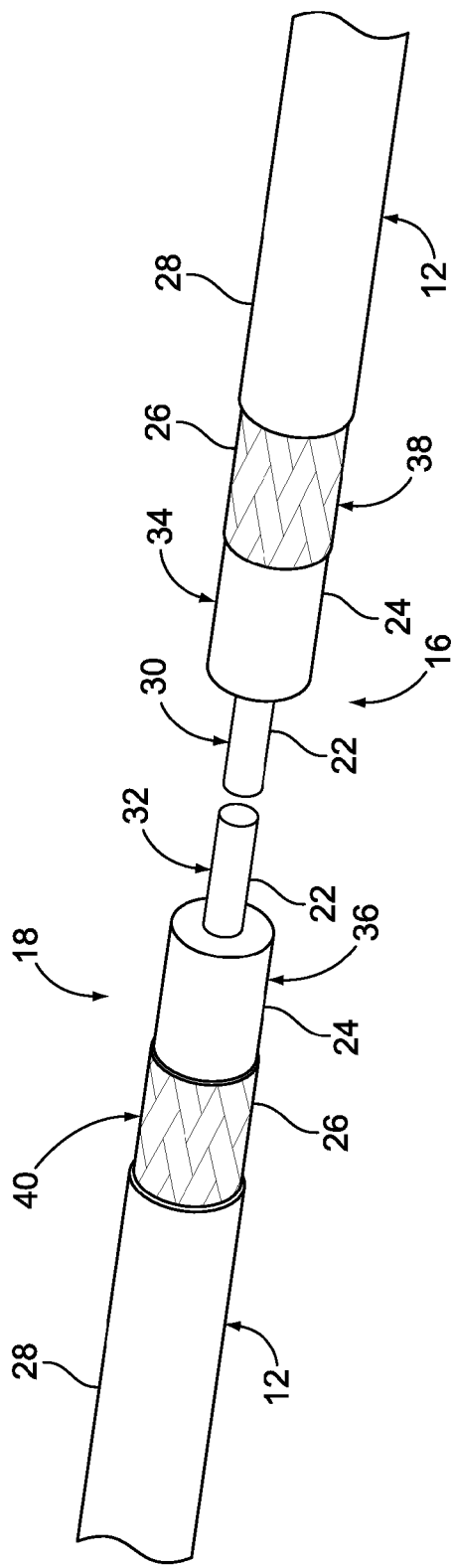
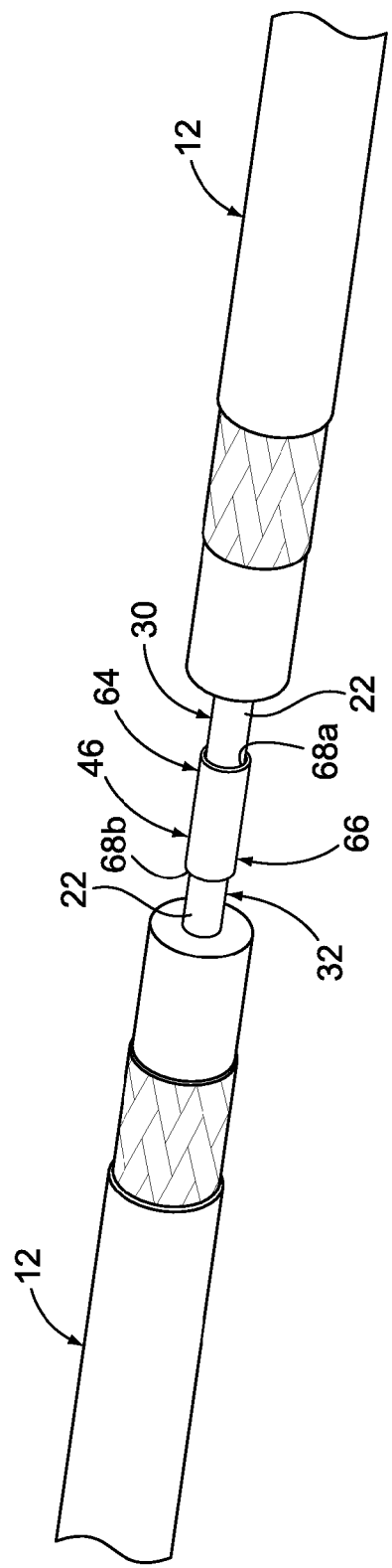

CABLE REPAIR SPLICE

BACKGROUND OF THE INVENTION

The subject matter described and/or illustrated herein relates generally to electrical cables.

Electrical cables are widely used for interconnecting components that are spaced apart from each other. Some typical examples of electrical cables include coaxial cables, triaxial cables, twin axial cables, and quadrax cables. Electrical cables may be nicked, cut, severed, abraded, and/or otherwise damaged during use. For example, an electrical cable may be cut or completely severed by a relatively sharp object. Electrical cables can also be completely severed by blunt objects that exert enough force to snap the cable. Abrasion may result from an electrical cable rubbing against a neighboring object. A kink is yet another example of cable damage. Damage to an electrical cable may impair operation of the cable. For example, damage to an electrical cable may interrupt the electrical paths of the cable such that the electrical cable is no longer capable of conveying data signals between the components.

When some known electrical cables are damaged, the cable is replaced instead of being repaired. For example, electrical cables that include more than two electrical conductors, that include conductors arranged concentrically, and/or that carry relatively high data rates (e.g., data rates above approximately 0.5 gigabits per second (Gbit/s)) are replaced instead of being repaired. Such electrical cables are replaced, instead of being repaired, because a repair will change the electrical properties of the cables. For example, an electrical cable that has been repaired may experience a change in the impedance of the cable along the location of the repair. Such a change in impedance may cause the electrical cable to experience signal losses, unwanted reflections, and/or the like along the location of the repair.

Replacing electrical cables is difficult, costly, and/or time consuming. For example, replacing an electrical cable entails disconnecting both ends of the electrical cable from the components and removing the electrical cable from the path between the components. An undamaged electrical cable must then be routed along the path and connected to the components. For relatively long cables and/or cables that are routed along complex paths and/or through tight spaces, removing the damaged cable and routing the undamaged cable may be particularly difficult, time-consuming, and/or costly. Moreover, the added cost of the undamaged cable may cause replacement of an electrical cable to be more costly than repair.

BRIEF DESCRIPTION OF THE INVENTION

In one embodiment, a splice kit is provided for repairing a cable having a central conductor, an insulator surrounding the central conductor, an outer conductive sheath surrounding the insulator, and a jacket surrounding the outer conductive sheath. The splice kit includes a central conductor joint that is electrically conductive and is configured to engage the central conductor of the cable such that the central conductor joint defines a portion of an electrical path of the central conductor. The splice kit also includes a dielectric insert configured to at least partially surround the central conductive joint and the central conductor of the cable, and an outer sheath joint that is electrically conductive and is configured to at least partially surround the dielectric insert. The outer sheath joint is configured to be electrically connected to the outer conductive sheath of the cable such that the outer sheath joint defines a portion of an electrical path of the outer conductive sheath. The splice kit further includes a jacket joint configured to at least partially surround the outer sheath joint and the jacket of the cable.

In another embodiment, a spliced cable assembly includes a cable having a central conductor, an insulator surrounding the central conductor, an outer conductive sheath surrounding the insulator, and a jacket surrounding the outer conductive sheath. The assembly also includes a splice having a central conductor joint that is electrically conductive and is engaged with the central conductor of the cable such that the central conductor joint defines a portion of an electrical path of the central conductor, and a dielectric insert at least partially surrounding the central conductive joint and the central conductor of the cable. The splice also includes an outer sheath joint that is electrically conductive and at least partially surrounds the dielectric insert. The outer sheath joint being electrically connected to the outer conductive sheath of the cable such that the outer sheath joint defines a portion of an electrical path of the outer conductive sheath. The assembly further includes a jacket joint at least partially surrounding the outer sheath joint and the jacket of the cable.

BRIEF DESCRIPTION OF THE DRAWINGS

FIG. 7 is a perspective view illustrating a coaxial cable of the spliced cable assembly shown in FIGS. 1 and 2, wherein the coaxial cable has been completely severed across the length thereof.

FIG. 8 is a perspective view illustrating the central conductor joint shown in FIG. 3 installed on the coaxial cable shown in FIG. 7.

DETAILED DESCRIPTION OF THE INVENTION

Figure 1:
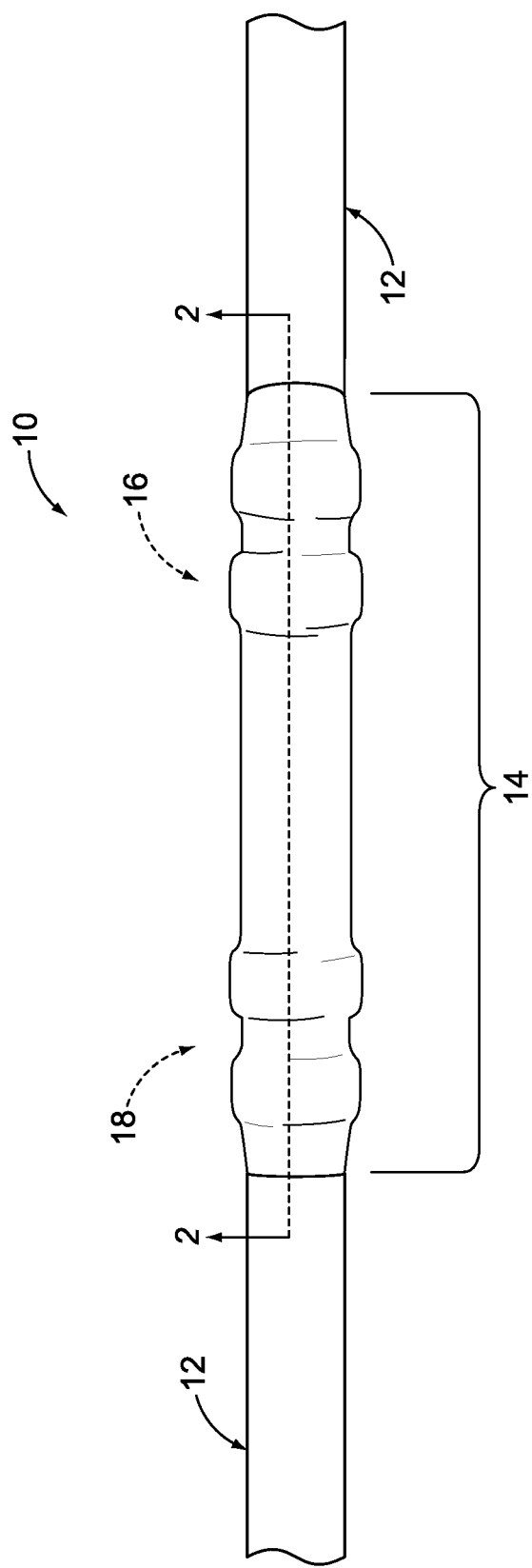
FIG. 1 is a perspective view of an exemplary embodiment of a spliced cable assembly.

FIG. 1 is a perspective view of an exemplary embodiment of a spliced cable assembly 10. The assembly 10 includes a coaxial cable 12 and a splice 14 that is used to repair the coaxial cable 12. In an exemplary embodiment, the coaxial cable 12 has been completely severed across the length thereof into opposing ends 16 and 18 that were electrically and mechanically disconnected from each other before the splice 14 was installed. The splice 14 electrically and mechanically connects the ends 16 and 18 together such that the splice 14 reestablishes the electrical and mechanical connection between the cable ends 16 and 18. The splice 14 thereby reestablishes the electrical paths of the coaxial cable that were interrupted when the coaxial cable 12 was severed. As will be described below, the splice 14 is configured to match an impedance of the coaxial cable 12 as closely as possible (e.g., within a predetermined percentage or ohm value). The splice 14 is configured to reduce or prevent a change in the impedance of the coaxial cable 12 along the splice 14 to reduce or prevent a change in the electrical performance of the coaxial cable 12 along the splice 14. For example, the splice 14 may reduce or prevent signal losses, unwanted reflections, and/or the like along the splice 14.

Figure 2:
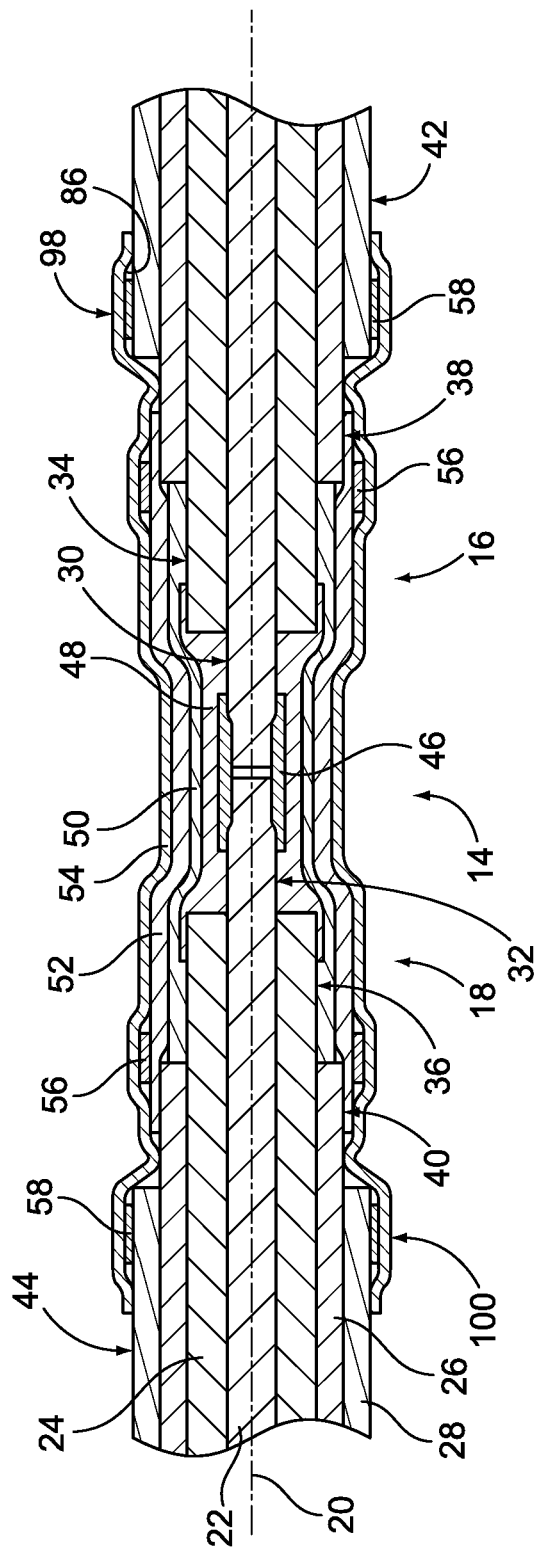
FIG. 2 is a cross-sectional view of the spliced cable assembly shown in FIG. 1 taken along line 2-2 of FIG. 1.

FIG. 2 is a cross-sectional view of the spliced cable assembly 10 taken along line 2-2 of FIG. 1. The coaxial cable 12 extends a length along a central longitudinal axis 20 and includes a central conductor 22, an insulator 24, an outer conductive sheath 26, and a jacket 28. The central conductor 22, the insulator 24, the outer conductive sheath 26, and the jacket 28 are arranged concentrically, or coaxially, about the central longitudinal axis 20. The central conductor 22 is electrically conductive and defines an electrical path along the length of the coaxial cable 12. The insulator 24 is dielectric and surrounds the central conductor 22 along the length of the coaxial cable 12. The outer conductive sheath 26 is electrically conductive and surrounds the insulator 24 along the length of the coaxial cable 12. The sheath 26 may be fabricated from strands of one or more material(s) that are braided together. Along the length of the coaxial cable 12, the insulator 24 extends radially (relative to the central longitudinal axis 20) between the central conductor 22 and the outer conductive sheath 26. In other words, the insulator 24 forms a layer of the coaxial cable 12 that is sandwiched between the central conductor 22 and the outer conductive sheath 26. The insulator 24 electrically insulates the central conductor 22 from the outer conductive sheath 26. The jacket 28 is electrically insulative and surrounds the outer conductive sheath 26 along the length of the coaxial cable 12.

At the ends 16 and 18 of the coaxial cable 12, the central conductor 22 has been severed such that the central conductor 22 includes opposing ends 30 and 32, respectively, that were disconnected from each other before the splice 14 was installed. The insulator 24 has been severed to include ends 34 and 36 at the cable ends 16 and 18, respectively. The ends 34 and 36 of the insulator 24 were disconnected before the splice 14 was installed. The outer conductive sheath 26 has also been severed to include opposing ends 38 and 40 at the ends 16 and 18, respectively, that were disconnected from each other. The jacket 28 has been severed such that the jacket 28 includes opposing severed ends 42 and 44 at the ends 16 and 18, respectively. The ends 42 and 44 of the jacket 28 were disconnected from each other before the splice 14 was installed.

As can be seen in FIG. 2, the splice 14 electrically and mechanically connects the severed ends 16 and 18 of the coaxial cable 12 together. An exemplary embodiment of the splice 14 includes a central conductor joint 46, a dielectric insert 48, a heat-shrink sleeve 50, an outer sheath joint 52, and an electrically insulative jacket joint 54. The central conductor joint 46 is engaged with the ends 30 and 32 of the central conductor 22 such that the central conductor joint 46 is electrically connected to each of the ends 30 and 32. The central conductor joint 46 mechanically joins and electrically connects the ends 30 and 32 together. The central conductor joint 46 defines a portion of the electrical path of the central conductor 22. In an exemplary embodiment, the central conductor joint 46 continues the electrical path of the central conductor 22 from the end 30 to the end 32 of the central conductor 22.

The insert 48 at least partially surrounds the central conductor joint 46 and the ends 30 and 32 of the central conductor 22. The insert 48 extends between the opposing ends 30 and 32 along the length of the coaxial cable 12. The insert 48 is dielectric and forms a continuation of the dielectric properties of the insulator 24 between the ends 34 and 36 of the insulator 24 and at least partially around the central conductor joint 46 and the ends 30 and 32 of the central conductor 22. Optionally, the insert 48 overlaps and/or abuts the ends 34 and/or 36 of the insulator 24 of the coaxial cable 12.

The heat-shrink sleeve 50 is optional such that in some embodiments, the splice 14 does not include the heat-shrink sleeve 50. The heat-shrink sleeve 50 is heat-recoverable. More particularly, the heat-shrink sleeve 50 is configured to shrink radially inwardly when heat is applied thereto. In other words, the diameter of the heat-shrink sleeve 50 reduces when the heat-shrink sleeve 50 is exposed to heat. The heat shrink sleeve 50 at least partially surrounds the insert 48 and the ends 34 and 36 of the insulator 24. As shown in FIG. 2, the heat-shrink sleeve 50 has been heat-recovered such that the heat-shrink sleeve 50 is engaged with exterior surfaces of the insert 48 and the ends 34 and 36 of the insulator 24. The heat-shrink sleeve 50 extends between the opposing ends 38 and 40 of the outer conductive sheath 26 along the length of the coaxial cable 12. The heat-shrink sleeve 50 is dielectric. The heat-shrink sleeve 50 may form a continuation of the dielectric properties of the insulator 24 between the ends 38 and 40 of the outer conductive sheath 26 of the coaxial cable 12. The heat-shrink sleeve 50 optionally abuts the ends 38 and/or 40 of the outer conductive sheath 28 of the coaxial cable 12.

The outer sheath joint 52 at least partially surrounds the insert 48 (and the heat-shrink sleeve 50 in an exemplary embodiment). The outer sheath joint 52 is engaged with the ends 38 and 40 of the outer conductive sheath 26 of the coaxial cable 12 to electrically connect the outer sheath joint 52 to the ends 38 and 40. The outer sheath joint 52 mechanically joins and electrically connects the ends 38 and 40 together such that the outer sheath joint 52 defines a portion of the electrical path of the outer conductive sheath 26. The outer sheath joint 52, in an exemplary embodiment, continues the electrical path of the outer conductive sheath 26 of the coaxial cable 12 from the end 38 to the end 40 of the outer conductive sheath 26. The insert 48 and the heat-shrink sleeve 50 electrically insulate the outer sheath joint 52 from the central conductor joint 46 and the ends 30 and 32 of the central conductor 22.

Optionally, the jacket joint 54 is heat-recoverable such that the jacket joint 54 is configured to shrink radially inwardly when heat is applied thereto. The jacket joint 54 at least partially surrounds the outer sheath joint 52 and the ends 42 and 44 of the cable jacket 28. As can be seen in FIG. 2, the jacket joint 54 has been heat-recovered and is thereby engaged with exterior surfaces of the outer sheath joint 52 and the ends 42 and 44 of the jacket 28. The jacket joint 54 extends between the opposing ends 42 and 44 of the cable jacket 28 along the length of the coaxial cable 12. The jacket joint 54 is electrically insulative. The jacket joint 54 may form a continuation of the electrically insulative, protective, and/or sealing properties of the cable jacket 28 between the ends 42 and 44 of the jacket 28.

The splice 14 optionally includes solder 56 engaged between the outer sheath joint 52 and the jacket joint 54. In an exemplary embodiment, the solder 56 engages the outer sheath joint 52 where the outer sheath joint 52 overlaps the ends 38 and 40 of the outer conductive sheath 26. The solder 56 facilitates mechanically connecting the jacket joint 54 to the outer sheath joint 52. The solder 56 may additionally or alternatively facilitate holding the outer sheath joint 52 on the ends 38 and 40 of the outer conductive sheath 26.

Optionally, the splice 14 includes adhesive 58 engaged between the jacket joint 54 and the cable jacket 28. More specifically, the adhesive is engaged between cable jacket 28 and the jacket joint 54 where the jacket joint 54 overlaps the ends 42 and 44 of the jacket 28. The adhesive 58 facilitates mechanically connecting the jacket joint 54 to the cable jacket 28, for example to provide strain relief to the interfaces between the splice 14 and the cable ends 16 and 18. In addition or alternatively, the adhesive may facilitate sealing the jacket joint 54 to the cable jacket 28, for example to prevent or reduce the ingress of a fluid (e.g., water) into the splice 14 and/or the coaxial cable 12.

The splice 14 is configured to match an impedance of the coaxial cable 12 as closely as possible, for example within a predetermined percentage or ohm value. As described below, the size, materials, position, location, dielectric constant, impedance, and/or the like of one or more components of the splice 14 may be selected to provide the splice 14 with an impedance that matches the impedance of the coaxial cable 12 as closely as possible.

Figure 3:
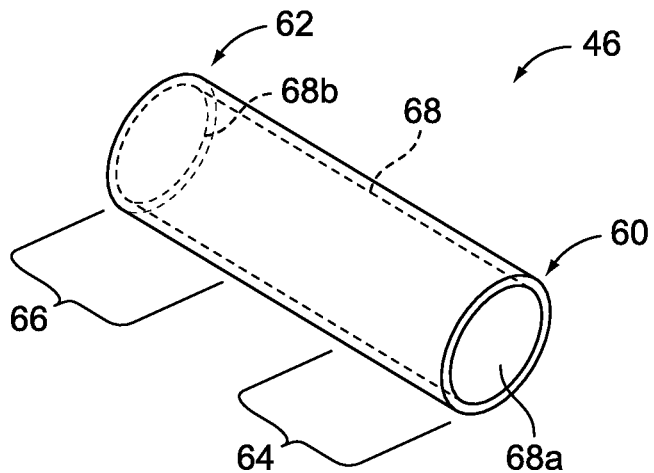
FIG. 3 is a perspective view of an exemplary embodiment of a central conductor joint of a splice of the spliced cable assembly shown in FIGS. 1 and 2.

FIG. 3 is a perspective view of an exemplary embodiment of the central conductor joint 46. In an exemplary embodiment, the central conductor joint is a crimp contact. The central conductor joint 46 extends a length from an end 60 to an opposite end 62. The central conductor joint 46 includes crimp barrels 64 and 66 at the ends 60 and 62, respectively. The crimp barrels 64 and 66 include respective openings 68a and 68b that extend through the ends 60 and 62 of the central conductor joint 46. The openings 68a and 68b are configured to receive the ends 30 and 32, respectively, of the central conductor 22 (FIGS. 2, 7, and 8) of the coaxial cable 12 (FIGS. 1, 2, 7-10, and 12). The crimp barrels 64 and 66 are configured to be crimped around the ends 30 and 32 (FIGS. 2, 7, and 8), respectively, of the central conductor 22 to electrically and mechanically connect the central conductor ends 30 and 32 to the central conductor joint 46. In an exemplary embodiment, the openings 68a and 68b are fluidly connected along the length of the joint 46 such that the central conductor joint 46 includes an opening 68 that includes the openings 68a and 68b and that extends completely through the length of the central conductor joint 46. However, in some alternative embodiments, the openings 68a and 68b are not fluidly connected along the length of the central conductor joint 46 such that the joint 46 includes two discrete openings 68a and 68b.

The central conductor joint 46 is electrically conductive such that the central conductor joint 46 is configured to electrically connect the ends 30 and 32 of the central conductor 22 together. The central conductor joint 46 may be fabricated from any material(s), such as, but not limited to, copper, tin, nickel, and/or the like. Optionally, the central conductor joint 46 is fabricated from the same material(s) as the central conductor 22 of the coaxial cable 12. In addition or alternative to the crimp contact, the central conductor joint 46 may include any other structure that enables the central conductor joint 46 to function as described and/or illustrated herein, such as, but not limited to, a solder joint, a welded joint (e.g., a butt weld), and/or the like.

Figure 4:
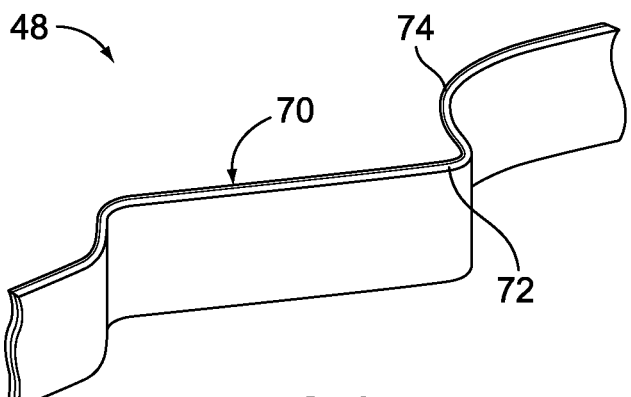
FIG. 4 is a perspective view of an exemplary embodiment of an insert of the splice.

FIG. 4 is a perspective view of an exemplary embodiment of the insert 48. The insert 48 includes a body 70. In an exemplary embodiment, the body 70 of the insert 48 is a length of dielectric tape that forms an elongate strip that can be wrapped, or wound, around the central conductor joint 46 (FIGS. 2, 3, and 8) and the ends 30 and 32 (FIGS. 2, 7, and 8) of the central conductor 22 (FIGS. 2, 7, and 8) of the coaxial cable 12 (FIGS. 1, 2, 7-10, and 12). The body 70 of the insert 48 includes a backing layer 72 and an optional adhesive 74 extending on the backing layer 72 along at least a portion of the length of the body 70.

The body 70 of the insert 48 is dielectric. The body 70 of the insert 48 may be fabricated from any material(s) that enable the body 70 to function as described and/or illustrated herein. In some embodiments, the body 70 is fabricated from a fluoropolymer, such as, but not limited to, polytetrafluoroethylene (PTFE), polyethylenetetrafluoroethylene (ETFE), fluorinated ethylene-propylene (FEP), perfluoroalkoxy polymer (PFA), polyvinylidene fluoride (PVDF), and/or the like. The fluoropolymer may be modified to provide the insert 48 with, or change, one or more of electrical, chemical, and/or mechanical properties. One example of modifying the fluoropolymer includes adding flame retardant additives to the fluoropolymer. Another example of modifying the fluoropolymer includes cross-linking the fluoropolymer.

Variables of the insert body 70 may be selected to facilitate matching the impedance of the splice 14 as closely as possible with the impedance of the coaxial cable 12. The variables of the insert body 70 may include, but are not limited to, the size (e.g., number or wraps, radial thickness, and/or the like), the material(s), the position, the location, and/or the electrical properties (e.g., dielectric constant, impedance, and/or the like) of the insert body 70. For example, the variables of the insert body 70 may be selected to provide the insert 48 with an impedance and/or dielectric constant that is within a predetermined percentage and/or ohm value of the coaxial cable 12 overall and/or one or more components of the coaxial cable 12 (e.g., the insulator 24 and/or the jacket 28). Providing the insert 48 with an impedance and/or dielectric constant that is within a predetermined percentage and/or ohm value of the coaxial cable 12 overall and/or one or more components of the coaxial cable 12 may facilitate matching the impedance of the splice 14 as closely as possible to the impedance of the coaxial cable 12. To facilitate matching the impedance of the splice 14 as closely as possible with the impedance of the coaxial cable 12, the insert body 70 may be fabricated from the same material(s) as the insulator 24 and/or the jacket 28 of the coaxial cable 12. But, in other embodiments, the insert body 70 is fabricated from one or more different materials than the insulator 24 and/or the jacket 28 to provide the insert body 70 with electrical properties that facilitate matching the impedance of the splice 14 as closely as possible with the impedance of the coaxial cable 12.

In some embodiments, the variables of the insert body 70 are selected to provide the insert body 70 with an impedance that is within approximately 10% of an impedance of the insulator 24, the jacket 28, and/or the coaxial cable 12 overall. The variables of the insert body 70 may be selected to provide the insert body 70 with an impedance that is within approximately 12%, particularly within 10%, especially within 5% of an impedance of the insulator 24, the jacket 28, and/or the coaxial cable 12 overall. The variables of the insert body 70 may be selected to provide the insert body 70 with an impedance that is within approximately two ohms of an impedance of the insulator 24, the jacket 28, and/or the coaxial cable 12 overall. Moreover, in some embodiments, the variables of the insert body 70 are selected to provide the insert body 70 with an impedance that is within approximately one ohm of an impedance of the insulator 24, the jacket 28, and/or the coaxial cable 12 overall. The variables of the insert body 70 may be selected to provide the insert body 70 with a dielectric constant that is within approximately 10% of a dielectric constant of the insulator 24 and/or the jacket 28 of the coaxial cable 12. Moreover, in some embodiments, the variables of the insert body 70 are selected to provide the insert body 70 with a dielectric constant that is within approximately 12%, particularly within 10%, especially within 5% of a dielectric constant of the insulator 24 and/or the jacket 28 of the coaxial cable 12.

In addition or alternative to the tape, the body 70 of the insert 48 may include any other structure that enables the insert 48 to function as described and/or illustrated herein. For example, in some alternative embodiments, the insert body 70 includes a dielectric tube (e.g., the body 170 shown in FIGS. 11 and 12, the body 270 shown in FIG. 13, and the body 370 shown in FIG. 14) having a central longitudinal opening that receives the central conductor joint 46 and the conductor ends 30 and 32 therein such that the tube at least partially surrounds the joint 46 and the ends 30 and 32. In such embodiments wherein the insert body 70 includes a dielectric tube, the tube may be a heat-shrink sleeve that is heat-recoverable. In some embodiments, the insert 48 is a heat-shrink sleeve (that is heat-recoverable) having a central longitudinal opening that holds the central conductor joint 46 therein before the splice 14 is installed, such that the insert 48 and the joint 46 are installed together.

Figure 5:
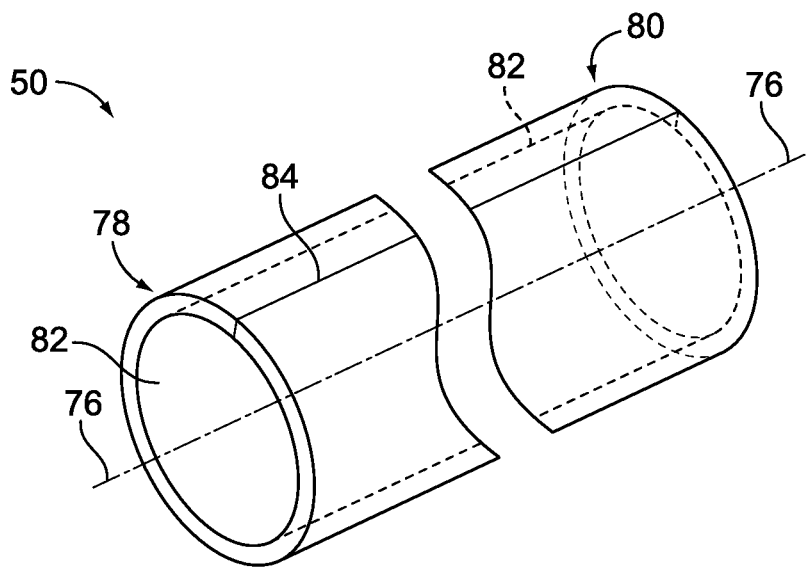
FIG. 5 is a perspective view of an exemplary embodiment of a heat-shrink sleeve of the splice.

FIG. 5 is a perspective view of an exemplary embodiment of the heat-shrink sleeve 50. The sleeve 50 extends a length along a central longitudinal axis 76 from an end 78 to an opposite end 80. A passageway 82 extends completely through the length of the heat-shrink sleeve 50. At the ends 78 and 80, the passageway 82 is configured to receive the ends 34 and 36 (FIGS. 2, 7, 9, 10, and 12), respectively, of the insulator 24 (FIGS. 7, 9, 10, and 12) of the coaxial cable 12 (FIGS. 1, 2, 7-10, and 12). The sleeve 50 includes an optional seam 84 to facilitate positioning the sleeve 50 around the insert 48 and the ends 34 and 36 of the insulator 24. As described above, the heat-shrink sleeve 50 is heat-recoverable. The heat-shrink sleeve 50 is configured to shrink radially inwardly (relative to the axis 76) around the ends 34 and 36 of the insulator 24, as well as around the insert 48.

The heat-shrink sleeve 50 is dielectric and may be fabricated from any material(s) that enable the sleeve 50 to function as described and/or illustrated herein. The heat-shrink sleeve 50, in some embodiments, is fabricated from a fluoropolymer, such as, but not limited to, fluorinated ethylene-propylene (FEP), polyvinylidene fluoride (PVDF), polytetrafluoroethylene (PTFE), polyethylenetetrafluoroethylene (ETFE), fluorinated ethylene-propylene (FEP), perfluoroalkoxy polymer (PFA), and/or the like. The fluoropolymer may be modified to provide the sleeve 50 with, or change, one or more electrical, chemical, and/or mechanical properties. One example of modifying the fluoropolymer includes adding flame retardant additives to the fluoropolymer. Another example of modifying the fluoropolymer includes cross-linking the fluoropolymer. The heat-shrink sleeve 50 is optionally transparent.

Similar to the insert 48 (FIGS. 2, 4, 9, and 10), variables of the heat-shrink sleeve 50 may be selected to facilitate matching the impedance of the splice 14 as closely as possible with the impedance of the coaxial cable 12. The variables of the sleeve 50 may include, but are not limited to, the size (e.g., number or wraps, radial thickness, and/or the like), the material(s), the position, the location, and/or the electrical properties (e.g., dielectric constant, impedance, and/or the like) of the heat-shrink sleeve 50. The variables of the heat-shrink sleeve 50 may be selected to provide the sleeve 50 with an impedance and/or dielectric constant that is within a predetermined percentage and/or ohm value of the coaxial cable 12 overall and/or one or more components of the coaxial cable 12 (e.g., the insulator 24 and/or the jacket 28). Providing the heat shrink sleeve 50 with an impedance and/or dielectric constant that is within a predetermined percentage and/or ohm value of the coaxial cable 12 overall and/or one or more components of the coaxial cable 12 may facilitate matching the impedance of the splice 14 as closely as possible to the impedance of the coaxial cable 12. Optionally, one or more electrical properties (e.g., impedance and/or dielectric constant) of the heat-shrink sleeve 50 is selected as identical to, and/or within a predetermined percentage of, the corresponding electrical propert(ies) of the insert 48.

To facilitate matching the impedance of the splice 14 as closely as possible with the impedance of the coaxial cable 12, the heat-shrink sleeve 50 may be fabricated from the same material(s) as the insulator 24, the jacket 28, and/or the insert 48. But, in other embodiments, the sleeve 50 is fabricated from one or more different materials than the insulator 24, the jacket 28, and/or the insert 48 to provide the sleeve 50 with electrical properties that facilitate matching the impedance of the splice 14 as closely as possible with the impedance of the coaxial cable 12.

In some embodiments, the variables of the heat-shrink sleeve 50 are selected to provide the sleeve 50 with an impedance that is within approximately 10% of an impedance of the insulator 24, the jacket 28, and/or the coaxial cable 12 overall. The variables of the sleeve 50, in some embodiments, are selected to provide the sleeve 50 with an impedance that is within approximately 5% of an impedance of the insulator 24, the jacket 28, and/or the coaxial cable 12 overall. The variables of the heat-shrink sleeve 50 may be selected to provide the sleeve 50 with an impedance that is within approximately two ohms of an impedance of the insulator 24, the jacket 28, and/or the coaxial cable 12 overall. Moreover, in some embodiments, the variables of the sleeve 50 are selected to provide the sleeve 50 with an impedance that is within approximately one ohm of an impedance of the insulator 24, the jacket 28, and/or the coaxial cable 12 overall. The variables of the heat-shrink sleeve 50 may be selected to provide the sleeve 50 with a dielectric constant that is within approximately 12% of a dielectric constant of the insulator 24 and/or the jacket 28 of the coaxial cable 12. Moreover, the variables of the sleeve 50, in some embodiments, are selected to provide the sleeve 50 with a dielectric constant that is within approximately 10% of a dielectric constant of the insulator 24 and/or the jacket 28 of the coaxial cable 12. In some embodiments, the variables of the sleeve 50 are selected to provide the sleeve 50 with a dielectric constant that is within approximately 5% of a dielectric constant of the insulator 24 and/or the jacket 28 of the coaxial cable 12.

The splice 14 is not limited to the sleeve 50. Rather, in addition or alternative to the sleeve 50, the splice 14 may include another structure, for example a dielectric tape that is wrapped around the insert 48 and the ends 34 and 36 of the insulator 24 of the coaxial cable 12.

Figure 6:
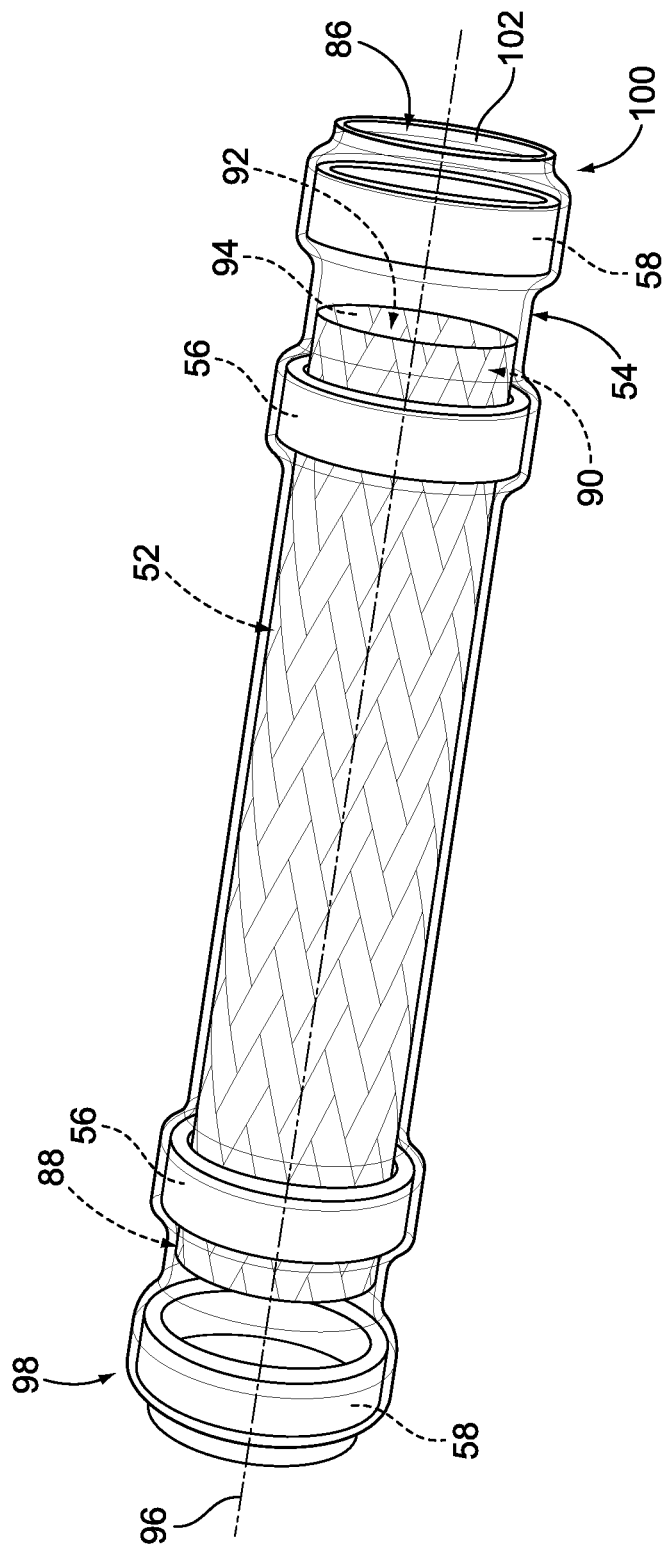
FIG. 6 is a perspective view of an exemplary embodiment of an outer sheath joint and an exemplary embodiment of a jacket joint of the splice.

FIG. 6 is a perspective view of an exemplary embodiment of the outer sheath joint 52 and the jacket joint 54. In an exemplary embodiment, the outer sheath joint 52 is held within a central passage 86 of the jacket joint 54 before the splice 14 is installed, and more particularly before the joints 52 and 54 are positioned around the outer conductive sheath 26 (FIGS. 2, 7, and 10) and the jacket 28 (FIGS. 2, 7, and 10), respectively, of the coaxial cable 12. Alternatively, the outer sheath joint 52 and the jacket joint 54 are separately installed over the outer conductive sheath 26 and the jacket 28, respectively.

The outer sheath joint 52 extends a length from an end 88 to an opposite end 90. A passageway 92 extends completely through the length of the outer sheath joint 52. At the ends 88 and 90, the passageway 92 is configured to receive the ends 38 and 40 (FIGS. 2, 7, and 10), respectively, of the outer conductive sheath 26 (FIGS. 2, 7, and 10) of the coaxial cable 12 (FIGS. 1, 2, 7-10, and 12). The joint 52 is electrically conductive such that the outer sheath joint 52 is configured to electrically connect the ends 38 and 40 of the outer conductive sheath 26 together. More particularly, when the ends 38 and 40 of the outer conductive sheath 26 are received within the passageway 92, a radially inner surface 94 of the joint 52 engages the ends 38 and 40 to electrically connect the joint 52 to the ends 38 and 40. Optionally, the outer sheath joint 52 includes a seam (not shown) to facilitate positioning the joint 52 around the heat-shrink sleeve 50 and the ends 38 and 40 of the outer conductive sheath 26. The joint 52 may be fabricated from any material(s), such as, but not limited to, copper, tin, nickel, and/or the like. In some embodiments, the outer sheath joint 52 is at least partially flexible. For example, in some embodiments, the outer sheath joint 52 is fabricated from strands of one or more material(s) that are braided together to provide the outer sheath joint 52 with at least some flexibility. Optionally, the outer sheath joint 52 is fabricated from the same material(s) as the outer conductive sheath 26 of the coaxial cable 12.

The jacket joint 54 extends a length along a central longitudinal axis 96 from an end 98 to an opposite end 100. The central passage 86 extends completely through the length of the jacket joint 54. The central passage 86 is configured to receive the ends 42 and 44 (FIGS. 2 and 10), respectively, of the cable jacket 28 (FIGS. 2, 7, and 10) at the ends 98 and 100, respectively. The joint 54 includes an optional seam (not shown) to facilitate positioning the sleeve jacket joint 54 around the outer sheath joint 52 and the ends 42 and 22 of the cable jacket 28. The seam of the jacket joint 54 may be aligned with the seam of the outer sheath joint 52 to facilitate simultaneously positioning the joints 52 and 54 over the outer conductive sheath 26 and the jacket 28, respectively, of the coaxial cable 12. In an exemplary embodiment, the jacket joint 54 is heat-recoverable such that the joint 54 is configured to shrink radially inwardly (relative to the axis 96) around the joint 52 and around ends 42 and 44 of the cable jacket 28.

In an exemplary embodiment, a radially inner surface 102 of the jacket joint 54 includes the solder 56 and the adhesive 58. More specifically, solder 56 and adhesive 58 is arranged on the surface 102 proximate each of the ends 98 and 100 of the jacket joint 54. The solder 56 and the adhesive 58 are each arranged on the surface 102 as continuous rings that extend completely around the central longitudinal axis 96. However, the solder 56 and the adhesive 58 may each be arranged on surface 102 of the jacket joint 54 in any other arrangement. For example, the solder 56 and/or the adhesive may be arranged as a discontinuous ring, a ring that extends along partially around the axis 96, as one or more drops, and/or the like.

The jacket joint 54 is electrically insulative and may be fabricated from any material(s) that enable the jacket joint 54 to function as described and/or illustrated herein. In some embodiments, the jacket joint 54 is fabricated from a fluoropolymer, such as, but not limited to, polyvinylidene fluoride (PVDF), fluorinated ethylene-propylene (FEP), polytetrafluoroethylene (PTFE), polyethylenetetrafluoroethylene (ETFE), fluorinated ethylene-propylene (FEP), perfluoroalkoxy polymer (PFA), and/or the like. The fluoropolymer may be modified to provide the joint 54 with, or change, one or more electrical, chemical, and/or mechanical properties. For example, the fluoropolymer may be cross-linked and/or may be modified to include flame retardant additives. Optionally, the jacket joint 54 is transparent.

Similar to the insert 48 (FIGS. 2, 4, 9, and 10) and the sleeve 50, variables of the jacket joint 54 may be selected to facilitate matching the impedance of the splice 14 as closely as possible with the impedance of the coaxial cable 12. The variables of the joint 54 may include, but are not limited to, the size (e.g., number or wraps, radial thickness, and/or the like), the material(s), the position, the location, and/or the electrical properties (e.g., dielectric constant, impedance, and/or the like) of the joint 54. The variables of the jacket joint 54 may be selected to provide the joint 54 with an impedance and/or dielectric constant that is within a predetermined percentage and/or ohm value of the coaxial cable 12 overall and/or one or more components of the coaxial cable 12 (e.g., the insulator 24 and/or the jacket 28). Providing the joint 54 with an impedance and/or dielectric constant that is within a predetermined percentage and/or ohm value of the coaxial cable 12 overall and/or one or more components of the coaxial cable 12 may facilitate matching the impedance of the splice 14 as closely as possible to the impedance of the coaxial cable 12. Optionally, one or more electrical properties (e.g., impedance and/or dielectric constant) of the jacket joint 54 is selected as identical to, and/or within a predetermined percentage of, the corresponding electrical propert(ies) of the insert 48 and/or the sleeve 50.

The jacket joint 54 may be fabricated from the same material(s) as the insulator 24, the jacket 28, the insert 48, and/or the sleeve 50 to facilitate matching the impedance of the splice 14 as closely as possible with the impedance of the coaxial cable 12. In some embodiments, the jacket joint 54 is fabricated from one or more different materials than the insulator 24, the jacket 28, the insert 48, and/or the sleeve 50 to provide the joint 54 with electrical properties that facilitate matching the impedance of the splice 14 as closely as possible with the impedance of the coaxial cable 12. In some embodiments, the variables of the jacket joint 54 are selected to provide the joint 54 with an impedance that is within approximately 10% of an impedance of the insulator 24, the jacket 28, and/or the coaxial cable 12 overall. The variables of the jacket joint 54, in some embodiments, are selected to provide the jacket joint 54 with an impedance that is within approximately 5% of an impedance of the insulator 24, the jacket 28, and/or the coaxial cable 12 overall. The variables of the jacket joint 54 may be selected to provide the joint 54 with an impedance that is within approximately two ohms of an impedance of the insulator 24, the jacket 28, and/or the coaxial cable 12 overall. Moreover, in some embodiments, the variables of the joint 54 are selected to provide the jacket joint 54 with an impedance that is within approximately one ohm of an impedance of the insulator 24, the jacket 28, and/or the coaxial cable 12 overall. In some embodiments, the variables of the jacket joint 54 are selected to provide the joint 54 with a dielectric constant that is within approximately 10% of a dielectric constant of the insulator 24 and/or the jacket 28 of the coaxial cable 12. Moreover, the variables of the jacket joint 54 may be selected to provide the jacket joint 54 with a dielectric constant that is within approximately 5% of a dielectric constant of the insulator 24 and/or the jacket 28 of the coaxial cable 12.

FIG. 7 is a perspective view illustrating the coaxial cable 12 before the splice 14 (FIGS. 1 and 2) has been installed. As shown in FIG. 7, the coaxial cable 12 has been completely severed across the length thereof into the opposing ends 16 and 18, which are electrically and mechanically disconnected from each other. For example, the ends 30 and 32 of the central conductor 22 of the coaxial cable 12 are electrically and mechanically disconnected from each other, as are the ends 38 and 40 of the outer conductive sheath 26. FIG. 7 illustrates the coaxial cable 12 after the cable 12 has been prepared for installation of the splice 14. More specifically, at each of the ends 16 and 18, the jacket 28 of the coaxial cable 12 has been stripped back to expose the outer conductive sheath 26, the insulator 24, and the central conductor 22. The outer conductive sheath 26 has been stripped back at each of the ends 16 and 18 to expose the insulator 24 and the central conductor 22. The insulator 24 has been stripped back to expose the central conductor 22 at both ends 16 and 18. As shown in FIG. 7, the coaxial cable 12 is ready for installation of the splice 14 to re-connect the ends 16 and 18.

FIG. 8 is a perspective view illustrating the central conductor joint 46 installed on the coaxial cable 12. To install the central conductor joint 46, the ends 30 and 32 of the central conductor 22 are inserted into the openings 68a and 68b, respectively, of the central conductor joint 46. More specifically, the ends 30 and 32 extend within the crimp barrels 64 and 66 of the central conductor joint 46. The crimp barrels 64 and 66 are crimped around the ends 30 and 32, respectively, of the central conductor 22 to reestablish an electrical and mechanical connection between the central conductor ends 30 and 32. When installed as shown in FIG. 8, the central conductor joint 46 electrically and mechanically connects the ends 30 and 32 of the central conductor 22 together. The central conductor joint 46 thereby reestablishes the electrical connection between the severed ends 30 and 32 of the central conductor 22. In other words, the joint 46 reestablishes the electrical path of the central conductor 22 that was interrupted when the coaxial cable 12 was severed.

Figure 9:
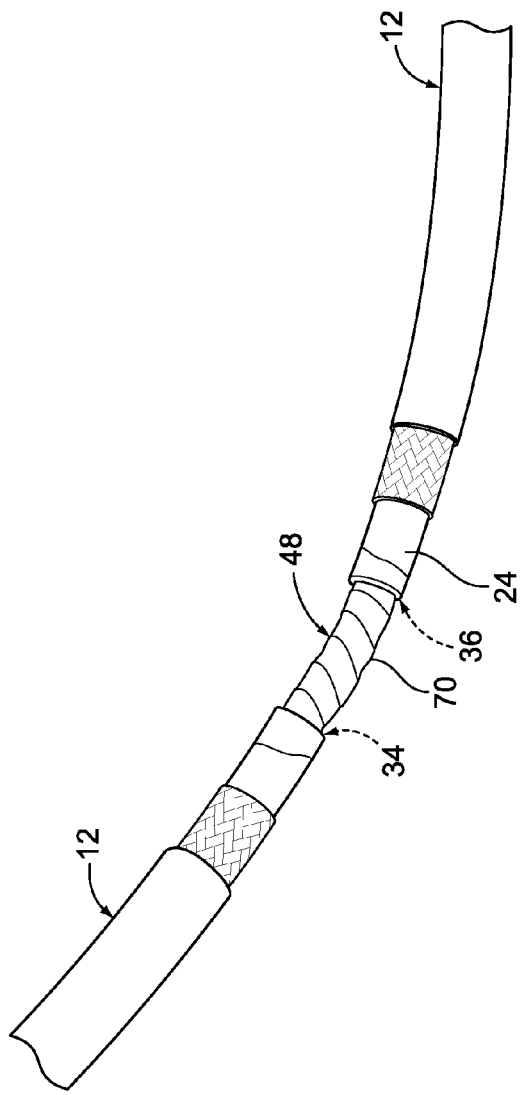
FIG. 9 is a perspective view illustrating the insert shown in FIG. 4 installed on the coaxial cable.

FIG. 9 is a perspective view illustrating the insert 48 installed on the coaxial cable 12. To install the insert 48, the body 70 of the insert 48 is wrapped around the central conductor joint 46 (FIGS. 2, 3, and 8) and the ends 30 and 32 (FIGS. 2, 7, and 8) of the central conductor 22 (FIGS. 2, 7, and 8), such that the insert body 70 at least partially surrounds the central conductor joint 46 and the central conductor ends 30 and 32. In an exemplary embodiment, the body 70 of the insert 48 overlaps and abuts the ends 34 and/or 36 of the insulator 24 of the coaxial cable 12. When installed as shown in FIG. 9, the insert body 70 forms a continuation of the dielectric properties of the cable insulator 24 between the ends 34 and 36 thereof. The body 70 of the insert 48 electrically insulates the central conductor joint 46 and the conductor ends 30 and 32.

If the insert body 70 includes the adhesive 74 (FIG. 4), the adhesive 74 may adhere to the central conductor joint 46 and the conductor ends 30 and 32 to hold the body 70 in position. In addition or alternative to the adhesive 74, the insert body 70 may be held in position by stiction, one or components extending over one or more ends of the body 70, and/or the like.

As can be seen in FIG. 9, in an exemplary embodiment, the insert body 70 is wrapped around the central conductor joint 46 and the conductor ends 32 and 34 to a diameter that is less than the diameter of the cable insulator 24. Alternatively, the insert body 70 is wrapped around the central conductor joint 46 and the conductor ends 32 and 34 to a diameter that is greater than or approximately equal to the diameter of the cable insulator 24, for example in embodiments wherein the splice 14 does not include the heat-shrink sleeve 50 (FIGS. 2, 5, and 10).

Figure 10:
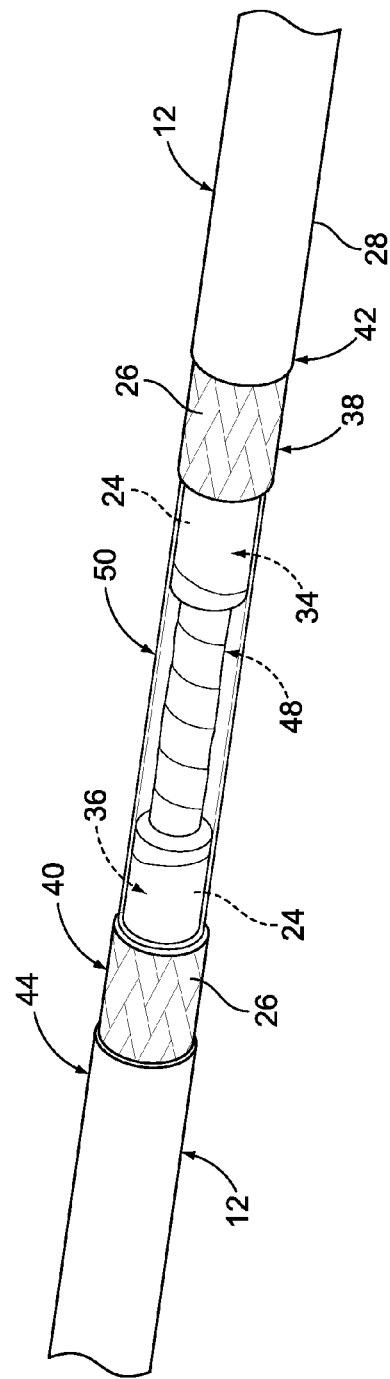
FIG. 10 is a perspective view illustrating the heat-shrink sleeve shown in FIG. 5 installed on the coaxial cable.

FIG. 10 is a perspective view illustrating the heat-shrink sleeve 50 installed on the coaxial cable 12. To install the sleeve 50, the sleeve 50 is positioned around the insert 48 and the ends 34 and 36 of the insulator 24 of the coaxial cable 12, such that the sleeve 50 at least partially surrounds the insert 48 and the insulator ends 34 and 36. The heat-shrink sleeve 50 may be positioned around the insert 48 and the insulator ends 34 and 36 by opening the seam 84 (FIG. 5) of the sleeve 50. Alternatively, the sleeve 50 can be fed over the length of the cable 12 to the location of the splice 14. Heat is then applied to heat-recover the sleeve 50. More specifically, the sleeve 50 shrinks radially inwardly and engages with exterior surfaces of the insert 48 and the ends 34 and 36 of the insulator 24. In an exemplary embodiment, the heat-shrink sleeve 50 abuts the ends 38 and 40 of the outer conductive sheath 26 of the coaxial cable 12.

When installed as shown in FIG. 10, the sleeve 50 forms a continuation of the dielectric properties of the cable insulator 24 between the ends 38 and 40 of the outer conductive sheath 26. The sleeve 50 electrically insulates the central conductor joint 46 (FIGS. 2, 3, and 8) and the conductor ends 30 and 32 (FIGS. 2, 7, and 8). As better seen in FIG. 2, in an exemplary embodiment, the diameter of the sleeve 50 after heat-recovery is less than the diameter of the outer conductive sheath 26. Alternatively, the diameter of the sleeve 50 after being heat-recovered is greater than or approximately equal to the diameter of the sheath 26.

FIG. 2 illustrates the outer sheath joint 52 and the jacket joint 54 installed on the coaxial cable 12. The outer sheath joint 52 and the jacket joint 54 will be described as being simultaneously installed on the coaxial cable 12. However, alternatively the outer sheath joint 52 and the jacket joint 54 are separately installed on the coaxial cable 12. To install the joints 52 and 54, the joints 52 and 54 are positioned around the ends 38 and 40 of the outer conductive sheath 26 and the ends 42 and 44 of the cable jacket 28, respectively. The joints 52 and 54 may be positioned around the sheath 26 and jacket 28, respectively, by opening the seams of the joints 52 and 54. Alternatively, the joints 52 and 54 are fed over the length of the cable 12 to the location of the splice 14.

When installed as shown in FIG. 2, the outer sheath joint 52 is engaged with the ends 38 and 40 of the outer conductive sheath 26 of the coaxial cable 12 such that the outer sheath joint 52 is electrically connected to the sheath 26. The outer sheath joint 52 thereby electrically connects the ends 38 and 40 of the outer conductive sheath 26 together. The outer sheath joint 52 reestablishes the electrical connection between the severed ends 38 and 40 of the outer conductive sheath 26. In other words, the joint 52 reestablishes the electrical path of the outer conductive sheath 26 that was interrupted when the coaxial cable 12 was severed.

The jacket joint 54 is positioned such that the joint 54 at least partially surrounds the outer sheath joint 52 and the ends 42 and 44 of the cable jacket 28. More specifically, the ends 42 and 44 of the cable jacket 28 are received within the central passage 86 of the jacket joint 54 at the ends 98 and 100 thereof, respectively. Heat is then applied to heat-recover the jacket joint 54, wherein the jacket joint 54 shrinks radially inwardly and engages with exterior surfaces of the outer sheath joint 52 and the ends 42 and 44 of the cable jacket 28. During heat-recovery of the jacket joint 54, the heat applied thereto melts the solder 56 and the adhesive 58. After cooling, the solder 56 and the adhesive 58 bind the jacket joint 54 to the outer sheath joint 52 and the cable jacket 28, respectively. When installed as shown in FIG. 10, the jacket joint 54 forms a continuation of the electrically insulative, protective, and/or sealing properties of the cable jacket 28 between the ends 42 and 44 of the jacket 28.

Referring again to FIG. 1, the splice 14 electrically and mechanically connects the ends 16 and 18 together such that the splice 14 reestablishes the electrical and mechanical connection between the cable ends 16 and 18. The splice 14 thereby reestablishes the electrical paths of the coaxial cable that were interrupted when the coaxial cable 12 was severed.

Figure 11:
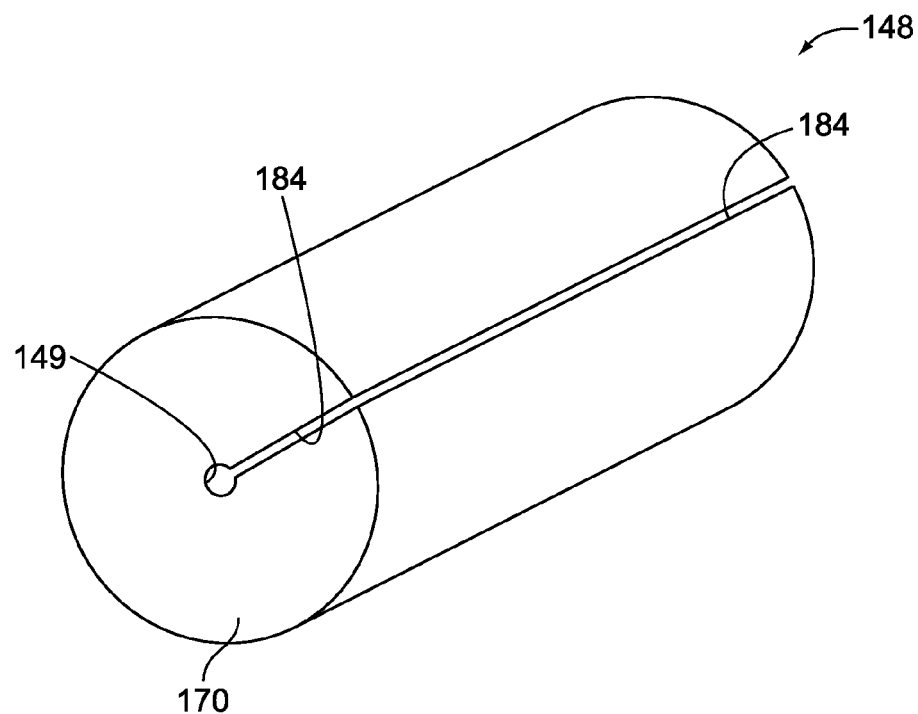
FIG. 11 is a perspective view of an exemplary alternative embodiment of an insert of the splice.

FIG. 11 is a perspective view of an exemplary alternative embodiment of an insert 148. The insert 148 includes a body 170. The body 170 of the insert 148 is a tube that includes a central longitudinal opening 149. The opening 149 receives the central conductor joint 46 (FIGS. 2, 3, and 8) and the ends 30 and 32 (FIGS. 2, 7, and 8) of the central conductor 22 (FIGS. 2, 7, and 8) of the coaxial cable 12 (FIGS. 1, 2, 7-10, and 12) therein such that the tube at least partially surrounds the joint 46 and the ends 30 and 32. The body 170 includes an optional seam 184 that communicates with the opening 149 to facilitate positioning the body 170 around the central conductor joint 46 and the ends 30 and 32 of the central conductor 22.

The body 170 of the insert 148 is dielectric and may be fabricated from any material(s) that enable the body 170 to function as described and/or illustrated herein. In some embodiments, the body 170 is fabricated from a fluoropolymer, such as, but not limited to, polytetrafluoroethylene (PTFE), polyethylenetetrafluoroethylene (ETFE), fluorinated ethylene-propylene (FEP), perfluoroalkoxy polymer (PFA), polyvinylidene fluoride (PVDF), and/or the like. Optionally, the fluoropolymer is modified to provide the insert 148 with, or change, one or more of electrical, chemical, and/or mechanical properties. Examples of modifying the fluoropolymer include, but are not limited to, adding flame retardant additives to the fluoropolymer, cross-linking the fluoropolymer, and/or the like.

Variables of the insert 148 and the insert body 170 may be selected to facilitate matching the impedance of the splice 14 as closely as possible with the impedance of the coaxial cable 12, for example as described above with respect to the insert 48 (FIGS. 2, 4, 9, and 10) and the insert body 70 (FIGS. 4 and 9).

Figure 12:
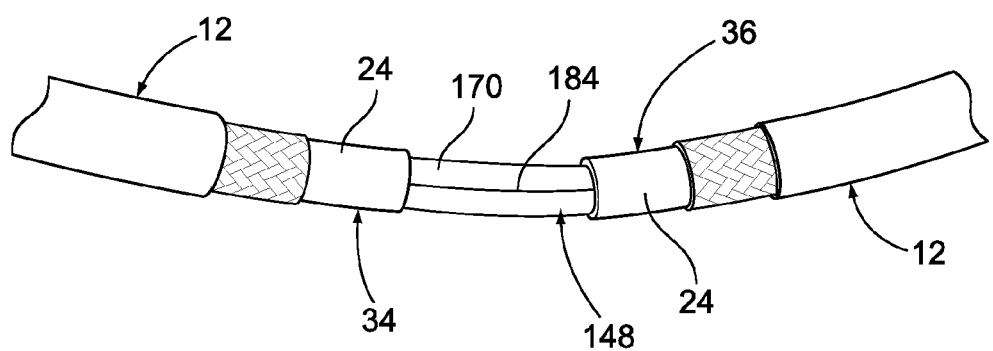
FIG. 12 is a perspective view illustrating the insert shown in FIG. 11 installed on the coaxial cable.

FIG. 12 is a perspective view illustrating the insert 148 installed on the coaxial cable 12. To install the insert 148, the insert body 170 is positioned around the central conductor joint 46 (FIGS. 2, 3, and 8) and the ends 30 and 32 (FIGS. 2, 7, and 8) of the central conductor 22 (FIGS. 2, 7, and 8) of the coaxial cable 12, such that the body 170 at least partially surrounds the joint 46 and the central conductor ends 30 and 32. The body 170 may be positioned around the joint 46 and the central conductor ends 30 and 32 by opening the seam 184 (FIG. 11). Alternatively, the body 170 can be fed over the length of the cable 12 to the location of the splice 14. In an exemplary embodiment, the body 170 of the insert 148 abuts the ends 34 and/or 36 of the insulator 24 of the coaxial cable 12. The body 170 may overlap the ends 34 and/or 36 of the insulator 24 in some embodiments. When installed as shown in FIG. 12, the insert body 170 forms a continuation of the dielectric properties of the cable insulator 24 between the ends 34 and 36 thereof. The body 170 of the insert 148 electrically insulates the central conductor joint 46 and the conductor ends 30 and 32. Optionally, tape and/or other fastening means (not shown) is wrapped around the body 170 to facilitate holding the body 170 in position around the central conductor joint 46 and the conductor ends 30 and 32. In addition or alternative to the tape and/or other fastening means, the insert body 170 may be held in position by stiction and/or by other components of the splice 14.

In an exemplary embodiment, the insert body 170 is wrapped around the central conductor joint 46 and the conductor ends 32 and 34 to a diameter that is less than the diameter of the cable insulator 24. But, the insert body 170 is alternatively wrapped around the central conductor joint 46 and the conductor ends 32 and 34 to a diameter that is greater than or approximately equal to the diameter of the cable insulator 24, for example in embodiments wherein the splice 14 does not include the heat-shrink sleeve 50 (FIGS. 2, 5, and 10).

Figure 13:
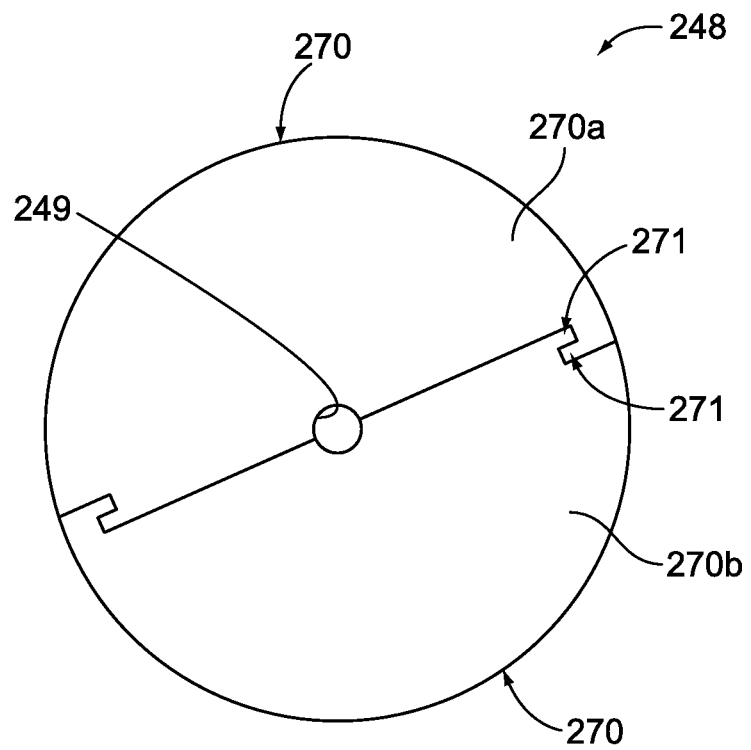
FIG. 13 is a side elevational view of another exemplary alternative embodiment of an insert of the splice.

FIG. 13 is a side elevational view of another exemplary alternative embodiment of an insert 248. The insert 248 includes a body 270 that includes two discrete body segments 270a and 270b. The segments 270a and 270b connect together to define a tube that includes a central longitudinal opening 249. The opening 249 receives the central conductor joint 46 (FIGS. 2, 3, and 8) and the ends 30 and 32 (FIGS. 2, 7, and 8) of the central conductor 22 (FIGS. 2, 7, and 8) of the coaxial cable 12 (FIGS. 1, 2, 7-10, and 12) therein such that the tube at least partially surrounds the joint 46 and the ends 30 and 32.

The segments 270a and 270b of the insert body 270 may connect together using any structure, method, means, configuration, arrangement, and/or the like. In an exemplary embodiment, the segments 270a and 270b include hooks 271 that interlock with each other in a snap-fit arrangement to connect the segments 270a and 270b together. Examples of other structure, method, means, configuration, arrangement, and/or the like for connecting the segments together include, but are not limited to, adhesive, tape, one or more elastic bands that extend around the body 270, and/or the like.

The body 270 of the insert 248 is dielectric and may be fabricated from any material(s) that enable the body 270 to function as described and/or illustrated herein. In some embodiments, the body 270 is fabricated from a fluoropolymer, such as, but not limited to, polytetrafluoroethylene (PTFE), polyethylenetetrafluoroethylene (ETFE), fluorinated ethylene-propylene (FEP), perfluoroalkoxy polymer (PFA), polyvinylidene fluoride (PVDF), and/or the like. Optionally, the fluoropolymer is modified to provide the insert 248 with, or change, one or more of electrical, chemical, and/or mechanical properties. Examples of modifying the fluoropolymer include, but are not limited to, adding flame retardant additives to the fluoropolymer, cross-linking the fluoropolymer, and/or the like.

Variables of the insert 248 and the insert body 270 may be selected to facilitate matching the impedance of the splice 14 as closely as possible with the impedance of the coaxial cable 12, for example as described above with respect to the insert 48 (FIGS. 2, 4, 9, and 10) and the insert body 70 (FIGS. 4 and 9).

Figure 14:
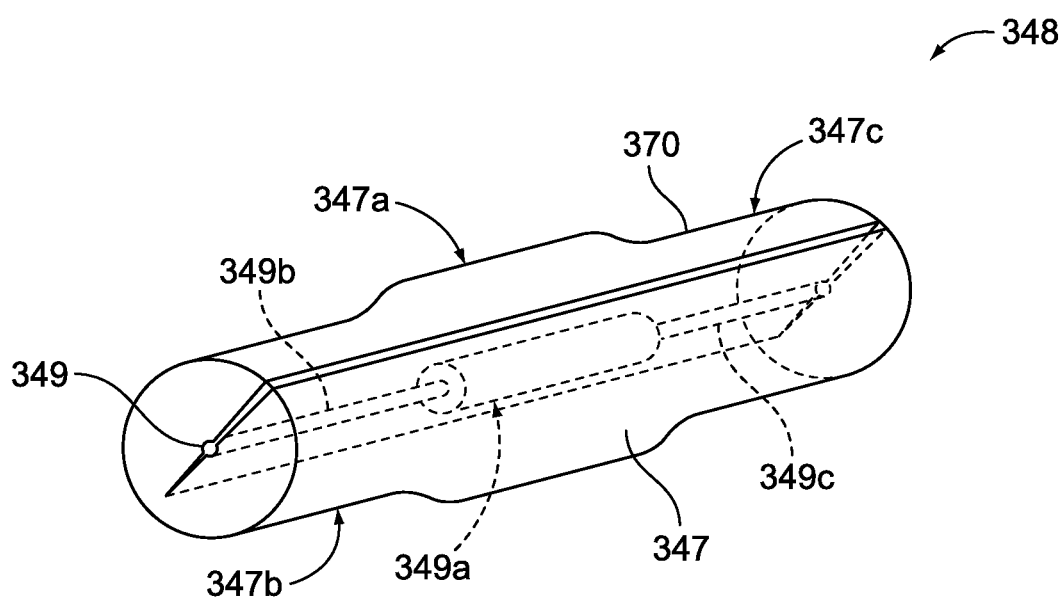
FIG. 14 is a perspective view of yet another exemplary alternative embodiment of an insert of the splice.

FIG. 14 is a perspective view of a yet another exemplary alternative embodiment of an insert 348. The insert 348 includes a body 370, which is a tube that includes a central longitudinal opening 349. Optionally, the opening 349 includes a central segment 349a that has a greater diameter than end segments 349b and 349c of the opening 349. The central segment 349a receives the central conductor joint 46 (FIGS. 2, 3, and 8) of the splice 14, while the end segments 349b and 349c receive the ends 30 and 32 (FIGS. 2, 7, and 8), respectively, of the central conductor 22 (FIGS. 2, 7, and 8) of the coaxial cable 12 (FIGS. 1, 2, 7-10, and 12) therein. The size and/or shape of the central segment 349a may be complementary with the size and/or shape of the central conductor joint 46. The size and/or shape of the segments 349b and 349c may be complementary with the size and/or shape of the central conductor ends 30 and 32, respectively.

The body 370 of the insert 348 includes an exterior profile 347. Optionally, the exterior profile 347 includes a central segment 347a that has a greater diameter than end segments 347b and 347c of the exterior profile 347. The diameter of the central segment 347a is optionally selected such that the ratio of the diameter of the central conductor joint 46 to the diameter of the central segment 347a is approximately equal to, or within a predetermined range, of the ratio of the diameter of the central conductor 22 to the segments 347b and 347c.

The body 370 of the insert 348 is dielectric and may be fabricated from any material(s) that enable the body 370 to function as described and/or illustrated herein. In some embodiments, the body 370 is fabricated from a fluoropolymer, such as, but not limited to, polytetrafluoroethylene (PTFE), polyethylenetetrafluoroethylene (ETFE), fluorinated ethylene-propylene (FEP), perfluoroalkoxy polymer (PFA), polyvinylidene fluoride (PVDF), and/or the like. Optionally, the fluoropolymer is modified to provide the insert 348 with, or change, one or more of electrical, chemical, and/or mechanical properties. Examples of modifying the fluoropolymer include, but are not limited to, adding flame retardant additives to the fluoropolymer, cross-linking the fluoropolymer, and/or the like.

Variables of the insert 348 and the insert body 370 may be selected to facilitate matching the impedance of the splice 14 as closely as possible with the impedance of the coaxial cable 12, for example as described above with respect to the insert 48 (FIGS. 2, 4, 9, and 10) and the insert body 70 (FIGS. 4 and 9).

Although shown and described herein as repairing a cable that has been completely severed, the splice embodiments described and/or illustrated herein are not limited thereto. Rather, the splice embodiments described and/or illustrated herein may be used to repair a cable that has been damaged in any other manner, such as, but not limited to, being nicked, cut, abraded, and/or the like. Depending on the nature of the damage, the severity of the damage, and/or the components of the cable that are damaged, the various components of the splice embodiments described and/or illustrated herein may be modified, deleted, added to, and/or the like.

The embodiments of the splice that are described and/or illustrated herein are not limited to being used with coaxial cables. Rather, the splice embodiments described and/or illustrated herein may be used to repair any type of cable, such as, but not limited to, twin axial cables, triaxial cables, quadrax cables, cables that carry relatively high data rates (e.g., data rates above approximately 0.5 gigabits per second (Gbit/s)), and/or the like. Depending on the construction of the cable, the various components of the splice embodiments described and/or illustrated herein may be modified, deleted, added to, and/or the like.

The embodiments described and/or illustrated herein may provide a splice for repairing a cable, wherein the splice is configured to match an impedance of the cable as closely as possible (e.g., within a predetermined percentage or ohm value). The embodiments described and/or illustrated herein may provide a splice that is configured to reduce or prevent a change in the impedance of the cable along the location of the splice to reduce or prevent a change in the electrical performance of the cable along the splice. For example, the embodiments described and/or illustrated herein may provide a splice that may reduce or prevent air gaps, signal losses, unwanted reflections, and/or the like along the splice.

It is to be understood that the above description is intended to be illustrative, and not restrictive. For example, the above-described embodiments (and/or aspects thereof) may be used in combination with each other (whether or not such a combination is explicitly discussed herein). In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A splice kit for repairing a cable having a central conductor, an insulator surrounding the central conductor, an outer conductive sheath surrounding the insulator, and a jacket surrounding the outer conductive sheath, said splice kit comprising:
    a central conductor joint that is electrically conductive and is configured to engage the central conductor of the cable such that the central conductor joint defines a portion of an electrical path of the central conductor;
    a dielectric insert configured to at least partially surround the central conductive joint and the central conductor of the cable;
    a dielectric heat-shrink sleeve configured to surround the dielectric insert and portions of the insulator of the cable disposed axially outside of the dielectric insert along a length of the cable;
    an outer sheath joint that is electrically conductive and is configured to surround the dielectric heat-shrink sleeve, the outer sheath joint being configured to be electrically connected to the outer conductive sheath of the cable such that the outer sheath joint defines a portion of an electrical path of the outer conductive sheath; and
    a jacket joint configured to at least partially surround the outer sheath joint and the jacket of the cable.

2. The splice kit of claim 1, wherein the insert comprises at least one of an impedance that is within approximately 12% of an impedance of the cable or a dielectric constant that is within approximately 12% of a dielectric constant of the insulator of the cable.

3. The splice kit of claim 1, wherein the insert comprises an impedance that is within approximately one ohm of an impedance of the cable.

4. The splice kit of claim 1, wherein the central conductor joint comprises at least one of a crimp contact, a solder joint, or a welded joint.

5. The splice kit of claim 1, wherein the insert comprises a dielectric tape that is wrapped around the central conductive joint and the central conductor of the cable.

6. The splice kit of claim 1, wherein the insert is fabricated from the same materials as the insulator of the cable.

7. The splice kit of claim 1, wherein the jacket joint comprises a radially inner surface and at least one of solder or adhesive extending on the radially inner surface, the solder being configured to engage the outer sheath joint, the adhesive being configured to engage the jacket of the cable.

8. The splice kit of claim 1, wherein the insulator of the cable is severed across a length thereof such that the insulator includes ends that are disconnected from each other, the insert being configured to extend between the ends of the insulator along a length of the cable, the insert overlapping the ends of the insulator.

9. The splice kit of claim 1, wherein the central conductor of the cable is severed across a length thereof such that the central conductor includes ends that are disconnected from each other, the central conductor joint being configured to join the ends together such that an electrical connection between the ends is reestablished.

10. The splice kit of claim 1, wherein the outer conductive sheath of the cable is severed across a length thereof such that the outer conductive sheath includes ends that are disconnected from each other, the outer sheath joint being configured to join the ends together such that an electrical connection between the ends is reestablished.

11. The splice kit of claim 1, wherein the outer conductive sheath of the cable is severed across a length thereof such that the outer conductive sheath includes ends that are disconnected from each other, the dielectric heat-shrink sleeve extending between and abutting the ends of the outer conductive sheath.

12. The splice kit of claim 1, wherein the dielectric insert has a unitary, one-piece tube-shaped body that defines a central opening extending longitudinally through the body along a length of the body, the body defining a seam between two inner walls of the body, the seam extending from the central opening to an outer surface of the body along the length of the body.

13. The splice kit of claim 1, wherein the dielectric insert has a tube-shaped body that defines a central opening through the body along a length of the body, the central opening including a central segment and two end segments, the central segment of the central opening being disposed axially between the end segments along the length of the body and having a diameter that is greater than a diameter of the end segments, an inner surface of the body along the central segment of the central opening directly engaging the central conductor joint, the inner surface of the body along the end segments of the central opening configured to directly engage the central conductor of the cable.

14. The splice kit of claim 13, wherein the body of the dielectric insert has an exterior profile that includes two end regions and a central region disposed axially between the two end regions, the central region of the exterior profile aligning with the central segment of the central opening, the end regions of the exterior profile aligning with the end segments of the central opening, the central region of the exterior profile having a greater outer diameter than an outer diameter of the end regions of the exterior profile.

15. A spliced cable assembly comprising:
a cable comprising a central conductor, an insulator surrounding the central conductor, an outer conductive sheath surrounding the insulator, and a jacket surrounding the outer conductive sheath; and
a splice comprising:
a central conductor joint that is electrically conductive and is engaged with the central conductor of the cable such that the central conductor joint defines a portion of an electrical path of the central conductor;
a dielectric insert at least partially surrounding the central conductive joint and the central conductor of the cable;
a dielectric heat-shrink sleeve configured to surround the dielectric insert and portions of the insulator of the cable disposed axially outside of the dielectric insert along a length of the cable;
an outer sheath joint that is electrically conductive and surrounds the dielectric heat-shrink sleeve, the outer sheath joint being electrically connected to the outer conductive sheath of the cable such that the outer sheath joint defines a portion of an electrical path of the outer conductive sheath; and
a jacket joint at least partially surrounding the outer sheath joint and the jacket of the cable.

16. The assembly of claim 15, wherein the insert comprises at least one of an impedance that is within approximately 12% of an impedance of the coaxial cable, a dielectric constant that is within approximately 12% of a dielectric constant of the insulator of the coaxial cable, or an impedance that is within approximately one ohm of an impedance of the cable.

17. The assembly of claim 15, wherein the central conductor of the cable is severed across a length thereof such that the central conductor includes ends that are disconnected from each other, the central conductor joint joining the ends together such that the central conductor joint establishes an electrical connection between the ends of the central conductor.

18. The assembly of claim 15, wherein the outer conductive sheath of the cable is severed across a length thereof such that the outer conductive sheath includes ends that are disconnected from each other, the outer sheath joint joining the ends together such that the outer sheath joint establishes an electrical connection between the ends of the outer conductive sheath.

19. The assembly of claim 15, wherein the insert is fabricated from the same materials as the insulator of the cable.

20. The assembly of claim 15, wherein the cable comprises one of a coaxial cable, a triaxial cable, a twin axial cable, or a quadrax cable.

* * * * *